ns. 8 Claims, 3 Drawing Sheets -->

United States Patent [19]

Hibi et al.

[11] Patent Number: 5,212,997
[45] Date of Patent: May 25, 1993

[54] FRICTION ROLLER TYPE CONTINUOUSLY VARIABLE TRANSMISSION

[75] Inventors: Toshifumi Hibi; Kazuhisa Sasahara, both of Kanagawa, Japan

[73] Assignee: Nissan Motor Co., Ltd., Yokohama, Japan

[21] Appl. No.: 875,326

[22] Filed: Apr. 29, 1992

[30] Foreign Application Priority Data

Jun. 12, 1991 [JP] Japan .................. 3-167538

[51] Int. Cl.⁵ .......................................... F16H 15/38
[52] U.S. Cl. .................................... 475/10; 475/42
[58] Field of Search ................ 74/190.5, 200, 201

[56] References Cited

U.S. PATENT DOCUMENTS

| 4,434,675 | 3/1984 | Kraus | 74/201 X |
| 5,052,236 | 10/1991 | Nakano | 74/200 |
| 5,099,710 | 3/1992 | Nakano | 74/200 |

FOREIGN PATENT DOCUMENTS

| 0373649 | 6/1990 | European Pat. Off. |  |
| 0373650 | 6/1990 | European Pat. Off. |  |
| 0415391 | 3/1991 | European Pat. Off. |  |
| 0459291 | 12/1991 | European Pat. Off. | 74/201 |
| 61-119865 | 6/1986 | Japan | 74/200 |
| 61-119866 | 6/1986 | Japan | 74/200 |
| 61-127964 | 6/1986 | Japan | 74/200 |
| 62-2062 | 1/1987 | Japan | 74/200 |
| 2-85560 | 3/1990 | Japan | 74/200 |
| 2-163549 | 6/1990 | Japan | |
| 4-29659 | 1/1992 | Japan | |

Primary Examiner—Allan D. Herrmann
Attorney, Agent, or Firm—Foley & Lardner

[57] ABSTRACT

A friction roller type continuously variable transmission comprises an input shaft, a first transmission mechanism, a second transmission mechanism, a thrust cam device and a hydraulically operated control device. The thrust cam device biases respective input discs of the first and second transmission mechanisms toward respective output discs of the same in accordance with a torque possessed by the input shaft. The biasing for the second input disc is indirectly made through the input shaft. The control device varies the speed change ratio of each transmission mechanism. A feedback control mechanism is employed, which is incorporated with the second transmission mechanism for feeding back the existing condition of the second transmission mechanism to the control device.

8 Claims, 3 Drawing Sheets

FRICTION ROLLER TYPE CONTINUOUSLY VARIABLE TRANSMISSION

BACKGROUND OF THE INVENTION

1. Field of the Invention

The present invention relates in general to transmissions for use in motor vehicles, and more particularly to continuously variable transmissions of a friction roller type.

2. Description of the Prior Art

In order to clarify the task of the present invention, one conventional continuously variable transmission of the friction roller type will be described, which is described in Japanese Patent First Provisional Publication No. 4-29659.

The transmission shown in the publication comprises generally a first continuously variable transmission mechanism which includes a first input disc, a first output disc, a pair of first friction rollers operatively interposed between the first input and output discs, a pair of first roller supporting members which rotatably support through respective eccentric shafts the first friction rollers and are rotatable about and slidable along respective rotation axes and a pair of first hydraulic power devices which move the first roller supporting members along the respective rotation axes and thus adjust the angular positions of the first friction rollers and a second continuously variable transmission mechanism which includes a second input disc, a second output disc, a pair of second friction rollers operatively interposed between the second input and output discs, a pair of second roller supporting members which rotatably support through respective eccentric shafts the second friction rollers and are rotatable and slidable along respective rotation axes and a pair of second hydraulic power devices which move the second roller supporting members along the respective rotation axes and thus adjust the angular positions of the second friction rollers.

The transmission further comprises a speed control valve which adjusts the hydraulic pressure fed to the first and second paired hydraulic power devices, and a thrust cam device installed at a back side of the first input disc to bias the first and second input discs toward the first and second output discs respectively.

The first continuously variable transmission mechanism is equipped with a cam mechanism which is operatively interposed between the speed control valve and one of the first roller supporting members. Due to provision of the cam mechanism, a feedback control for the first continuously variable transmission mechanism is carried out in which the existing condition of the first transmission mechanism is fed back to the speed control valve which adjusts the angular positions which the first and second friction rollers assume.

However, due to its inherent construction, the above-mentioned conventional transmission has the following drawbacks.

That is, the biasing force produced by the thrust cam device is not evenly applied to the first and second input discs of the first and second continuously variable transmission mechanisms. That is, the biasing force transmitted to the second input disc is somewhat smaller than that to the first input disc. This is because the biasing force for the second input disc should be transmitted thereto through an input shaft which has various bearings mounted thereto, which bearings cause non-negligible friction resistance against the axial movement of the input shaft. As is known, such insufficient biasing force tends to cause an unstable operation of the second continuously variable transmission mechanism due to slippage of the friction rollers or the like.

SUMMARY OF THE INVENTION

It is therefore an object of the present invention to provide a friction roller type continuously variable transmission which is free of the above-mentioned drawback.

According to the present invention, a measure is provided in which for eliminating the above-mentioned drawback, a cam mechanism is incorporated with a second continuously variable transmission mechanism in place of a first continuously variable transmission mechanism.

According to a first aspect of the present invention, there is provided a friction roller type continuously variable transmission which comprises an input shaft; a first transmission mechanism concentrically disposed about the input shaft and including a first input disc, a first output disc and a first pair of friction rollers operatively disposed between the first input and output discs; a second transmission mechanism concentrically disposed about the input shaft and arranged behind the first transmission mechanism in a back-to-back relationship, the second transmission mechanism including a second input disc, a second output disc and a second pair of friction rollers operatively disposed between the second input and output discs; first means for biasing the first and second input discs toward the first and second output discs respectively in accordance with a torque possessed by the input shaft, the biasing for the first input disc being directly made, while the biasing for the second input disc being indirectly made through the input shaft; second means for varying angular positions of the first and second pairs of frictions rollers with respect to the associated input and output discs in accordance with an instruction applied thereto; and third means for correcting the operation of the second means by feeding back the existing condition of the second transmission mechanism to the second means.

According to a second aspect of the present invention, there is provided a friction roller type continuously variable transmission which comprises a first transmission mechanism including a first input disc, a first output disc, a pair of first friction rollers operatively interposed between the first input and output discs, a pair of first friction roller supporting members which rotatably support through respective eccentric shafts the first friction rollers and are rotatable about and movable along respective first rotation axes and a pair of first hydraulic power devices which can move the first friction roller supporting members along the respective first rotation axes; a second transmission mechanism including a second input disc, a second output disc, a pair of second friction rollers operatively interposed between the second input and output discs, a pair of second friction roller supporting members which rotatably support through respective eccentric shafts the second friction rollers and are rotatable about and movable along respective second rotation axes and a pair of second hydraulic power devices which can move the second friction roller supporting members along the respective second rotation axes; a speed control valve for varying the hydraulic pressures fed to the paired first and second hydraulic power devices; a thrust cam device arranged at a back side of the first input disc and generating a thrust in accordance with an input torque; a thrust transmitting shaft for transmitting the thrust to the second input disc; and a feedback control mechanism which transmits the movement of one of the second friction roller supporting members to the speed control valve.

DETAILED DESCRIPTION OF THE INVENTION

Figure 1:
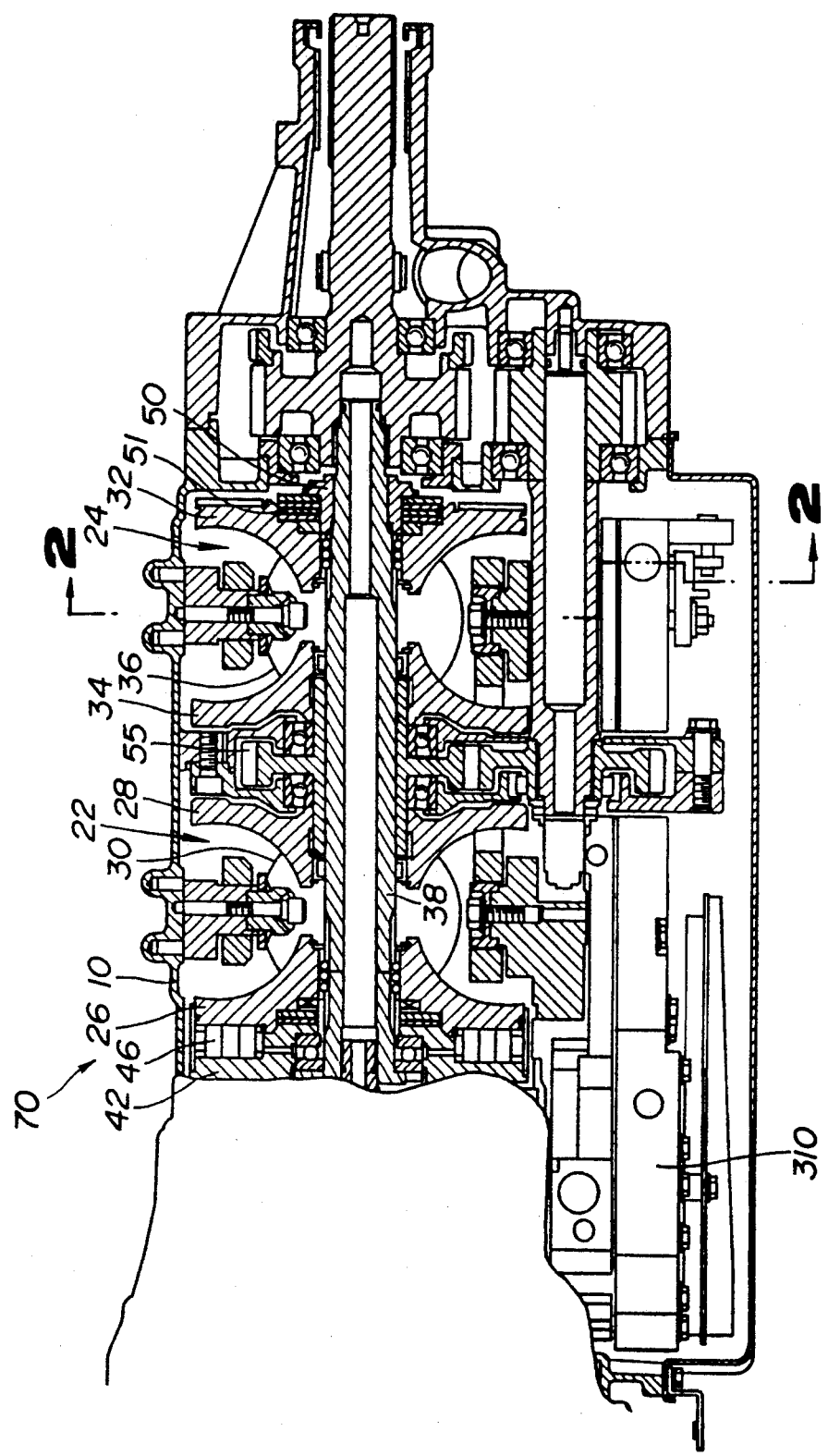
FIG. 1 is a partially cut sectional view of a friction roller type continuously variable transmission according to the present invention.

Referring to the drawings, particularly FIG. 1, there is shown a friction roller type continuously variable transmission mechanism of the present invention.

Within a casing 10, there are coaxially installed first and second continuously variable transmission mechanisms 22 and 24.

For ease of description, these mechanisms 22 and 24 will be designated to first and second transmission mechanisms.

The first transmission mechanism 22 comprises a first input disc 26, a first output disc 28 and a first pair of friction rollers 30 each being operatively disposed between respective toroidal surfaces of the first input and output discs 26 and 28. Thus, by changing the angular position of each friction roller 30 relative to the input and output discs 26 and 28, the rotation speed ratio (viz., gear ratio) between these two discs is continuously varied.

Similar to the first transmission mechanism 22, the second transmission mechanism 24 comprises a second input disc 32, a second output disc 34 and a second pair of friction rollers 36 each being operatively disposed between respective toroidal surfaces of the second input and output discs 32 and 34.

As is understood from the drawing, the arrangement of the second input and output discs 32 and 34 is opposite to that of the first input and output discs 26 and 28. That is, the first and second output discs 28 and 34 are arranged back to back with each other.

The first input disc 26 is disposed about an input shaft 38 (or thrust transmitting shaft) 38 through a ball-spline connection. With this connection, the first input disc 26 rotates together with the input shaft 38 while permitting a relative axial movement therebetween. Although not shown, the input shaft 38 is connected to a known torque converter through a known forward/reverse switching mechanism.

At a back side of the first input disc 26, there is installed a thrust cam device 70. The thrust cam device 70 comprises a cam flange 72 having a cam surface, a cam-shaped back surface of the first input disc 26 and several groups of cam rollers 46 which are operatively disposed between the cam surface of the cam flange 72 and the cam-shaped back surface of the first input disc 26.

The thrust cam device 70 is so constructed and arranged that when a relative rotation takes place between the input disc 26 and the cam flange 42, the grouped cam rollers 46 operate to bias the first and second input discs 26 and 32 toward the first and second output discs 28 and 34 respectively. The biasing for the second input disc 32 is made through the input shaft 38.

One example of such thrust cam device 70 is described in Japanese Patent First Provisional Publication No. 2-163549.

Similar to the first input disc 26, the second input disc 32 of the second transmission mechanism 24 is disposed about the input shaft 38 through a ball-spline connection. Thus, the second input disc 32 rotates together with the input shaft 38 while permitting a relative axial movement therebetween. The second input disc 32 is biased toward the second output disc 34 by a compressed disc spring 51 which is held by a loading nut 50 screwed onto the input shaft 38.

The first and second output discs 28 and 34 are arranged back to back with each other and rotatabl disposed about the input shaft 38 through respecti\ needle bearings (no numerals). Between the first and second output discs 28 and 34, there is installed a drive gear 55 which rotates together with the output discs 28 and 34.

Figure 2:
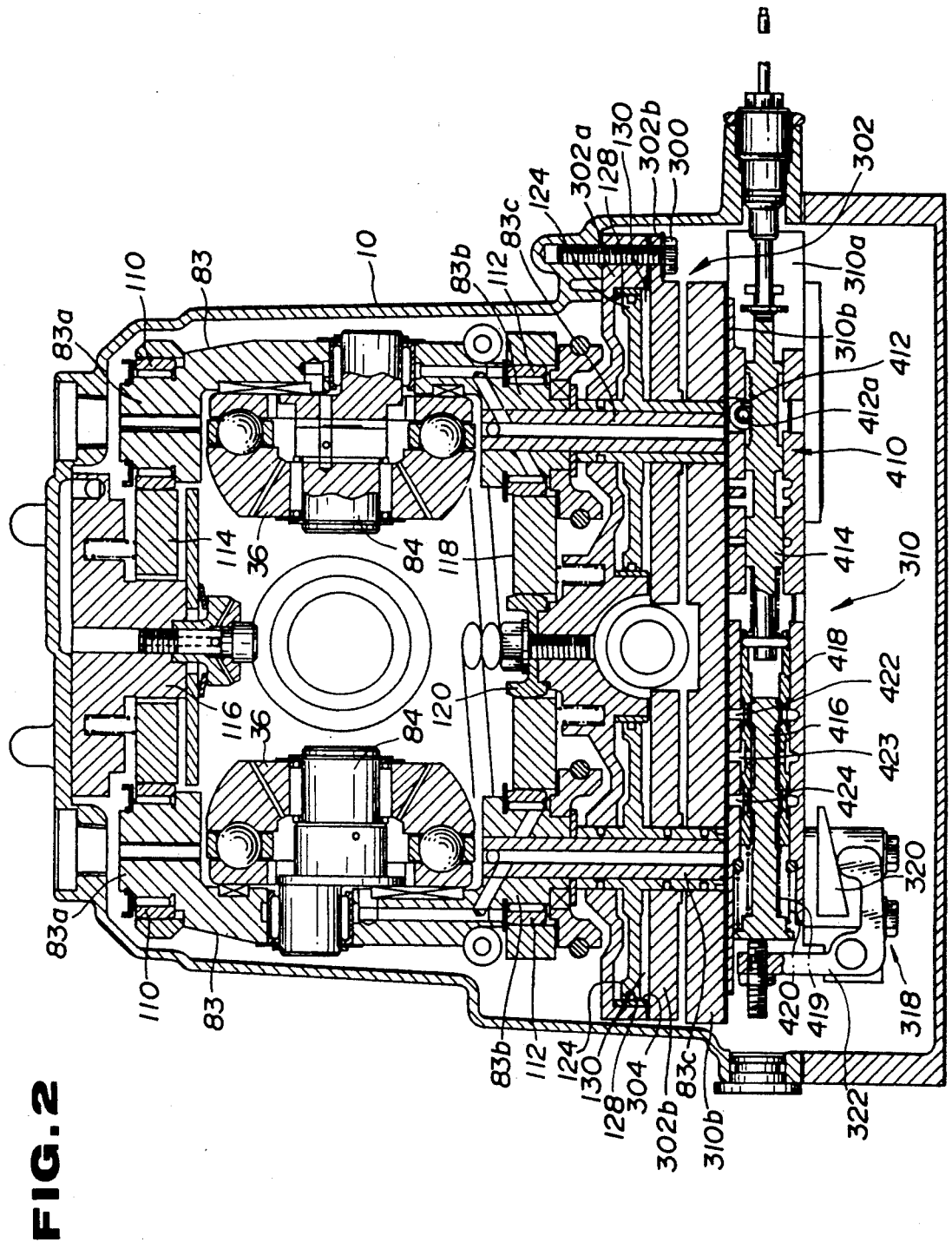
FIG. 2 is a sectional view taken along the line 2—2 of FIG. 1.

Referring to FIG. 2, there is shown in a sectional manner an essential portion of the transmission of the present invention, which is a portion where the second transmission mechanism 24 is located.

It is to be noted that the whole construction of the first transmission mechanism 22 is substantially the same as that of the next-described second transmission mechanism 24 except for a feedback control mechanism.

As is seen from FIG. 2, a roller supporting member 83 for each friction roller 36 has upper and lower rotation shaft portions 83a and 83b which are rotatably and axially movably supported by spherical bearings 110 and 112. To each roller supporting member 83, there is connected the corresponding friction roller 36 through an eccentric shaft 84.

The spherical bearings 110 for the roller supporting members 83 are supported by a link 114 which is supported by a link post 116 secured to the casing 10. The other spherical bearings 112 for the roller supporting members 83 are supported by another link 118 which is supported by another link post 120.

Each roller supporting member 83 has an extended shaft portion 83c which coaxially extends downward from the lower rotation shaft portion 83b. Thus, the extended shaft portion 83c, the lower shaft portion 83b and the upper shaft portion 83a rotate integrally about a common axis.

Circular pistons 124 are coaxially disposed on the respective extended shaft portions 83c to move therewith. These piston 124 are sealingly received in respective cylindrical bores 304 formed in a main cylinder body 302a which is secured to the casing 10 through bolts 300 (only one is shown).

Attached to a lower surface of the main circular body 302a is an auxiliary cylinder body 302b which is secured to the casing 10 through the bolts 300. The main and auxiliary cylinder bodies 302a and 302b thus constitute a cylinder body 302 within which are defined two enclosed cylinderical bores 304 for the respective pistons 124. Thus, first and second work chambers 128 and 130 are defined by the piston 124 in each enclosed cylindrical bore 304.

When a hydraulic pressure difference occurs between the first and second work chambers 128 and 130, the piston 124 and thus the associated roller supporting member 83 is axially moved upward or downward. It is to be noted that the vertical arrangement of the first and second work chambers 128 and 130 is opposite between the right and left cylindrical bores 304.

Thus, the pistons 124 and the cylindrical bores 304 of the cylinder body 302 constitute a pair of hydraulic power devices.

It is to be noted that the first transmission mechanism 22 has also a similar hydraulic power device.

As is seen from FIGS. 2 and 3, below the cylinder body 302, there is installed a valve body 310. The cylinder body 302 and the valve body 310 are independently secured to the casing 10, and these bodies 302 and 310 are not directly connected with each other.

The valve body 310 comprises a main body portion 310a and an auxiliary body portion 310b which are coupled.

To the main body portion 310a, there are installed a spool 416 of a speed control valve 410, a spool 317 of a manual valve and other known spools (not shown).

The speed control valve 410 is actuated by a step motor 412 which operates in accordance with a desired rotation speed ratio as instructed. The step motor 412 carries a pinion 412a for actuating the valve 410.

The speed control valve 410 comprises a spool 414 having a rack portion meshed with the pinion 412a. Thus, upon energization of the step motor 412, the spool 414 is axially moved. The spool 414 has one end connected to an end of a coaxially arranged sleeve 418. Thus, the spool 414 and the sleeve 418 can move together. Within the sleeve 418, there is slidably received another spool 416. A spring 419 is compressed between the spool 416 and the sleeve 418 thereby to bias the sleeve 418 rightward in FIG. 2, and another spring 420 is compressed between the spool 416 and the auxiliary body portion 310b thereby to bias the spool 416 leftward in FIG. 2.

The main body portion 310a of the valve body 310 is formed with oil passages 422, 423 and 424. The oil passage 422 is connected to the first work chambers 128, while the other oil passage 424 is connected to the second hydraulic chambers 130.

It is to be noted that the oil passages 422 and 424 are also connected to corresponding first and second work chambers of the hydraulic power device of the first transmission mechanism 22.

The oil passage 423 is connected to a known line pressure source. Thus, the line pressure from the oil passage 423 is distributed to the oil passages 422 and 424 in accordance with the relative positioning between the spool 416 and the sleeve 418.

That is, when the spool 416 and the sleeve 418 assume the neutral positions as shown in FIG. 2, the hydraulic pressures fed to the oil passages 422 and 424 are equalized. When the sleeve 418 is moved rightward relative to the spool 416, the hydraulic pressure fed to the oil passage 424 becomes higher than that to the oil passage 422, while, when the sleeve 418 is moved leftward relative to the spool 416, the hydraulic pressure fed to the oil passage 424 becomes lower than that to the oil passage 422.

Figure 3:
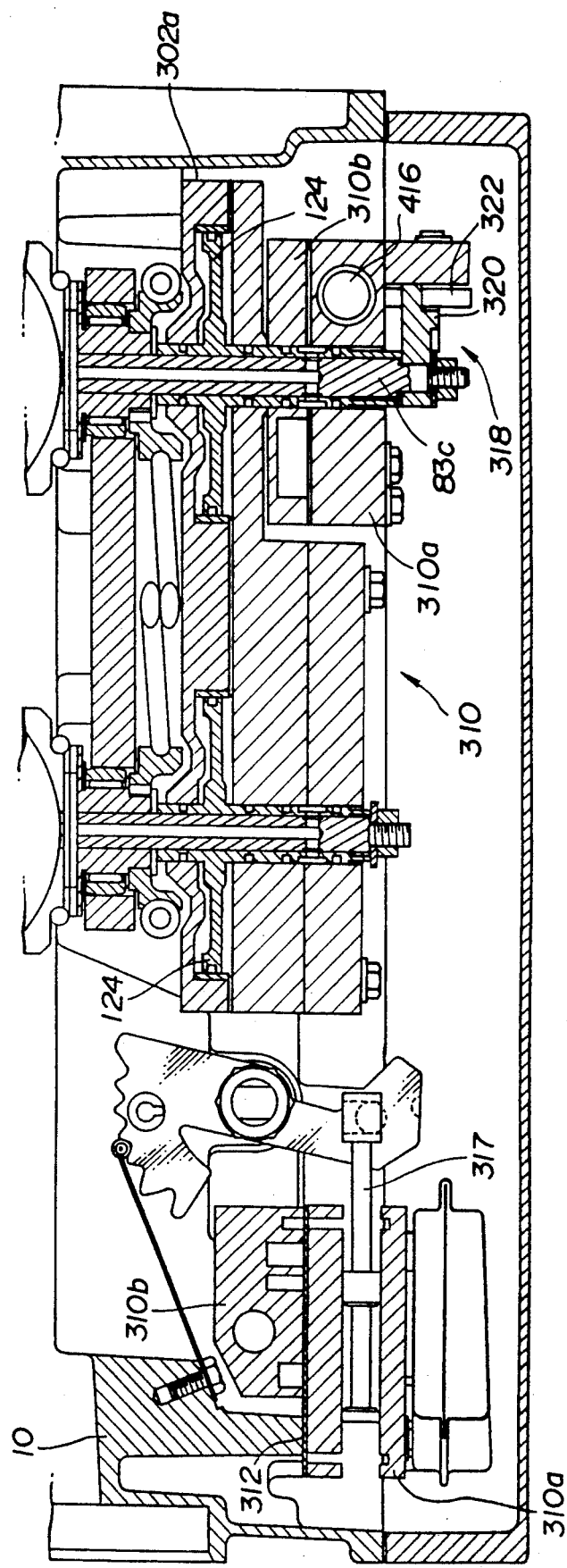
FIG. 3 is a sectional view of an essential portion of the transmission of the present invention.

As is seen from FIG. 3, the extended shaft portion 83c of one roller supporting member 83 (which is the member 83 shown in the left side of FIG. 2) passes through aligned bores (no numerals) formed in the auxiliary body portion 310b and the main body portion 310a. An exposed lower end of the extended shaft portion 83c is incorporated with a cam mechanism 318.

As is understood from FIGS. 2 and 3, the cam mechanism 318 comprises a cam 320 which is secured to the exposed lower end of the extended shaft portion 83c to rotate therewith and a pivotal link 322 which has one end slidably engaged with a slanted surface of the cam 320. As is seen from FIG. 2, the other end of the pivotal link 322 carries a bolt (no numeral) which contacts one end of the spool 416. Thus, when, due to rotation or axial movement of the extended shaft portion 83c, the cam 320 is rotated in a given direction about the axis of the extended shaft portion 83c or moved in a given direction along the axis, the pivotal link 322 is forced to pivot causing the bolt to push the spool 416.

The extended shaft portion 83c, the cam 320, the pivotal link 322 and the bolt thus constitute a feedback control mechanism which can control the second transmission mechanism 32 in a feedback operation manner.

In the following, operation will be described with reference to the drawings.

When, as is understood from FIG. 1, the input shaft 38 rotates, the first and second input discs 26 and 32 are rotated in the same direction, and the thrust cam device 70 generates a thrust in accordance with torque possessed by the input shaft 38. With this thrust, the first friction rollers 30 are optimally sandwiched between the first input and output discs 26 and 28 achieving a smoothed power transmission from the first input disc 26 to the first output disc 28.

At the same time, due to the work of the thrust cam device 70, the input shaft 38 is biased or moved leftward in FIG. 1 pulling the second input disc 32 in the same direction with a certain biasing force. With this biasing force, the second friction rollers 36 are sandwiched between the second input and output discs 32 and 34 achieving a power transmission from the second input disc 32 to the second output disc 34.

Upon requirement of increasing the rotation speed ratio (gear ratio), the spool 414 (see FIG. 2) is moved rightward together with the sleeve 418 by the step motor 412.

Because the rightward movement of the sleeve 418 does not induce a synchronous movement of the spool 416, there is created, but for a short time, a condition wherein the relative positioning between the sleeve 418 and the spool 416 is changed.

Due to this change, the hydraulic pressure in the oil passage 424 is increased and the hydraulic pressure in the other oil passage 422 is lowered.

Thus, the piston 124 shown in the right side of FIG. 2 is moved upward together with the associated extended shaft portion 83c and the piston 124 shown in the left side is moved downward together with the associated extended shaft portion 83c. The right and left roller supporting members 83 are thus pivoted in opposite directions at the upper and lower rotation shaft portions 83a and 83b thereof. With this, each of the second friction rollers 36 is so inclined as to contact a smaller diameter part of the second input disc 32 and to contact a larger diameter part of the second output disc 34. The rotation speed ration between the second input and output discs 32 and 34 is thus increased.

It is to be noted that the change of the relative positioning between the sleeve 418 and the spool 416 induces a similar operation of the first transmission mechanism 22.

As will be understood from FIG. 2, the pivot movement of the left roller supporting member 83 is transmitted to the cam 320 through the associated extended shaft portion 83c to cause a clockwise pivoting of the pivotal link 322. Thus, the bolt pushes the spool 416 rightward. With this rightward movement of the spool 416, the hydraulic pressures in the oil passages 422 and 424 finally become equalized.

Upon requirement of reducing the rotation speed ratio, operation is carried out in a reversed manner with respect to the above-mentioned operation.

In the present invention, the following advantageous operation is carried out.

For the reason as has been described hereinafore, the biasing force applied to the second input disc 32 by the thrust cam device 70 is somewhat smaller than that applied to the first input disc 26. This means that the stability of the second transmission mechanism 24 is somewhat poor as compared with the first transmission mechanism 22.

However, in accordance with the present invention, the cam mechanism 318 is incorporated with the second transmission mechanism 24. Thus, a feedback control for the second transmission mechanism 24 is carried out in which the existing condition of the second transmission mechanism 24 is fed back to the speed control valve 410 which controls the first and second transmission mechanisms 22 and 24. This means that even when the second transmission mechanism 24 runs into an unstable state, the mechanism 24 can be instantly returned to normal condition due to the feedback operation.

What is claimed is:

1. A friction roller type continuously variable transmission comprising:
   an input shaft;
   a first transmission mechanism concentrically disposed about said input shaft and including a first input disc, a first output disc and a first pair of friction rollers operatively disposed between said first input and output discs;
   a second transmission mechanism concentrically disposed about said input shaft and arranged behind said first transmission mechanism in a back-to-back relationship, said second transmission mechanism including a second input disc, a second output disc and a second pair of friction rollers operatively disposed between said second input and output discs;
   first means for biasing said first and second input discs toward said first and second output discs respectively in accordance with a torque possessed by said input shaft, the biasing action for said first input disc being directly made, while the biasing action for said second input disc being indirectly made through said input shaft;
   second means for varying angular positions of said first and second pairs of friction rollers with respect to the associated input and output discs in accordance with an instruction applied thereto; and
   a cam mechanism which corrects the varying of angular positions by said second means by feeding back an existing condition of said second transmission mechanism to said second means.

2. A friction roller type continuously variable transmission as claimed in claim 1, in which said cam mechanism comprises:
   an elongate portion of a roller supporting member by which one of said second friction rollers is supported through an eccentric shaft, said elongate portion being rotatable about and movable along an axis thereof;
   a cam secured to said elongate portion to move therewith, said cam having a slanted surface formed thereon; and
   a pivotal link having one end which is slidably engaged with said slanted surface of said cam and an other end which abuts against a part of said second means.

3. A friction roller type continuously variable transmission as claimed in claim 2, in which said cam mechanism further comprises a bolt which is carried by the other end of said pivotal link and abuts against the part of said second means.

4. A friction roller type continuously variable transmission as claimed in claim 2, in which said second means comprises:
   a hydraulic power device for axially moving said elongate portion of said roller supporting member; and
   a speed control valve for varying a hydraulic pressure fed to said hydraulic power device in accordance with the instruction applied thereto, said speed control valve having said part against which the other end of said pivotal link abuts.

5. A friction roller type continuously variable transmission as claimed in claim 4, in which said speed control valve comprises:
   a valve body having an elongate bore;
   a sleeve axially slidably received in said bore; and
   a spool axially slidably received in said sleeve, said spool having one end against which the other end of said pivotal link abuts.

6. A friction roller type continuously variable transmission as claimed in claim 5, in which said speed control valve further comprises:
   a first spring compressed between said spool and said sleeve; and
   a second spring compressed between said spool and said valve body.

7. A friction roller type continuously variable transmission as claimed in claim 6, in which said first means is a thrust cam device which comprises:
   a cam flange having a cam surface;
   a cam-shaped back surface of said first input disc; and
   groups of cam rollers, each group being operatively disposed between the cam surface of said cam flange and the cam-shaped back surface of said first input disc.

8. A friction roller type continuously variable transmission comprising:
   a first transmission mechanism including a first input disc, a first output disc, a pair of first friction rollers operatively interposed between said first input and output discs, a pair of first friction roller supporting members which rotatably support through respective eccentric shafts the first friction rollers and are rotatable about and movable along respective first rotation axes and a pair of first hydraulic power devices which can move the first friction roller supporting members along the respective first rotation axes;
   a second transmission mechanism including a second input disc, a second output disc, a pair of second friction rollers operatively interposed between said second input and output discs, a pair of second friction roller supporting members which rotatably support through respective eccentric shafts the second friction rollers and are rotatable about and movable along respective second rotation axes and a pair of second hydraulic power devices which can move the second friction roller supporting members along the respective second rotation axes;

a speed control valve for varying hydraulic pressure fed to said first and second pairs of hydraulic power devices;

a thrust cam device arranged at a back side of said first input disc and generating a thrust in accordance with an input torque;

a thrust transmitting shaft for transmitting said thrust to said second input disc; and a feedback control mechanism which transmits movement of one of said second friction roller supporting members to said speed control valve.

* * * * *